(12) United States Patent
Ito

(10) Patent No.: US 7,961,405 B2
(45) Date of Patent: Jun. 14, 2011

(54) ZOOM LENS AND OPTICAL APPARATUS INCLUDING THE SAME

(75) Inventor: Rei Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/837,332

(22) Filed: Jul. 15, 2010

(65) Prior Publication Data

US 2011/0026131 A1 Feb. 3, 2011

(30) Foreign Application Priority Data

Jul. 31, 2009 (JP) ................................ 2009-179028

(51) Int. Cl.
*G02B 15/14* (2006.01)
(52) U.S. Cl. ....................................................... 359/689
(58) Field of Classification Search .................... 359/689
See application file for complete search history.

(56) References Cited

U.S. PATENT DOCUMENTS 7,023,623 B2 4/2006 Miyatake et al.

FOREIGN PATENT DOCUMENTS

JP 2006-208890 A 8/2006

*Primary Examiner* — William C Choi
(74) *Attorney, Agent, or Firm* — Canon U.S.A., Inc. I.P. Division

(57) ABSTRACT

A zoom lens includes a first lens unit having a negative refractive power, a second lens unit having a positive refractive power, and a third lens unit having a positive refractive power. The first lens unit, the second lens unit, and the third lens unit are arranged in order from an object side to an image side. The first, second and third lens units move during zooming. The first lens unit is formed by two lenses, and the third lens unit is formed by one lens. A lateral magnification of the second lens unit at a wide angle end, a focal length of the first lens unit, a focal length of the third lens unit, a focal length of the entire zoom lens at the wide angle end, and a moving amount of the first lens unit along the optical axis from the wide angle end to a telephoto end are set appropriately based on predetermined conditional expressions.

9 Claims, 13 Drawing Sheets

WIDE ANGLE

INTERMEDIATE

TELEPHOTO

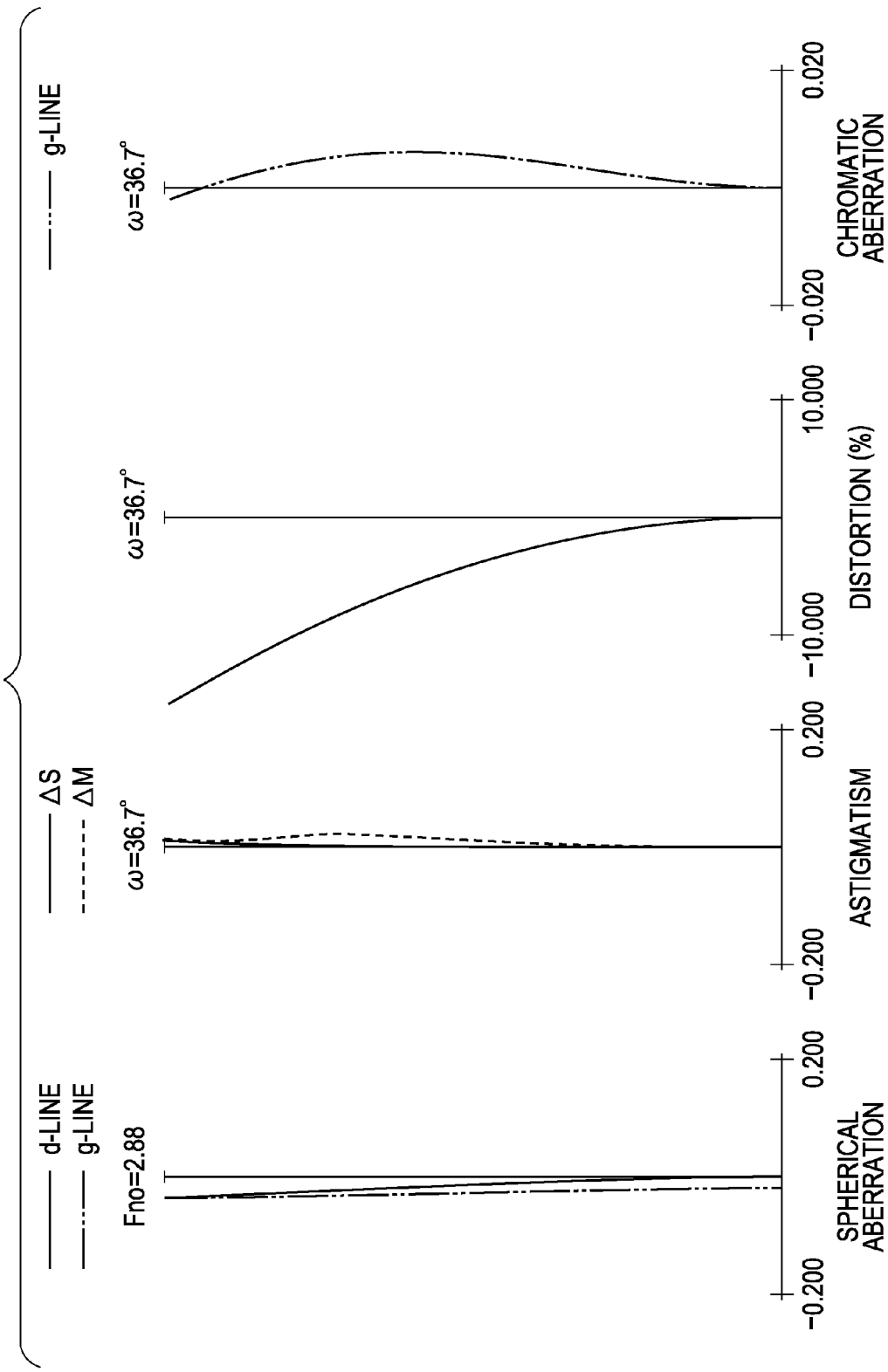

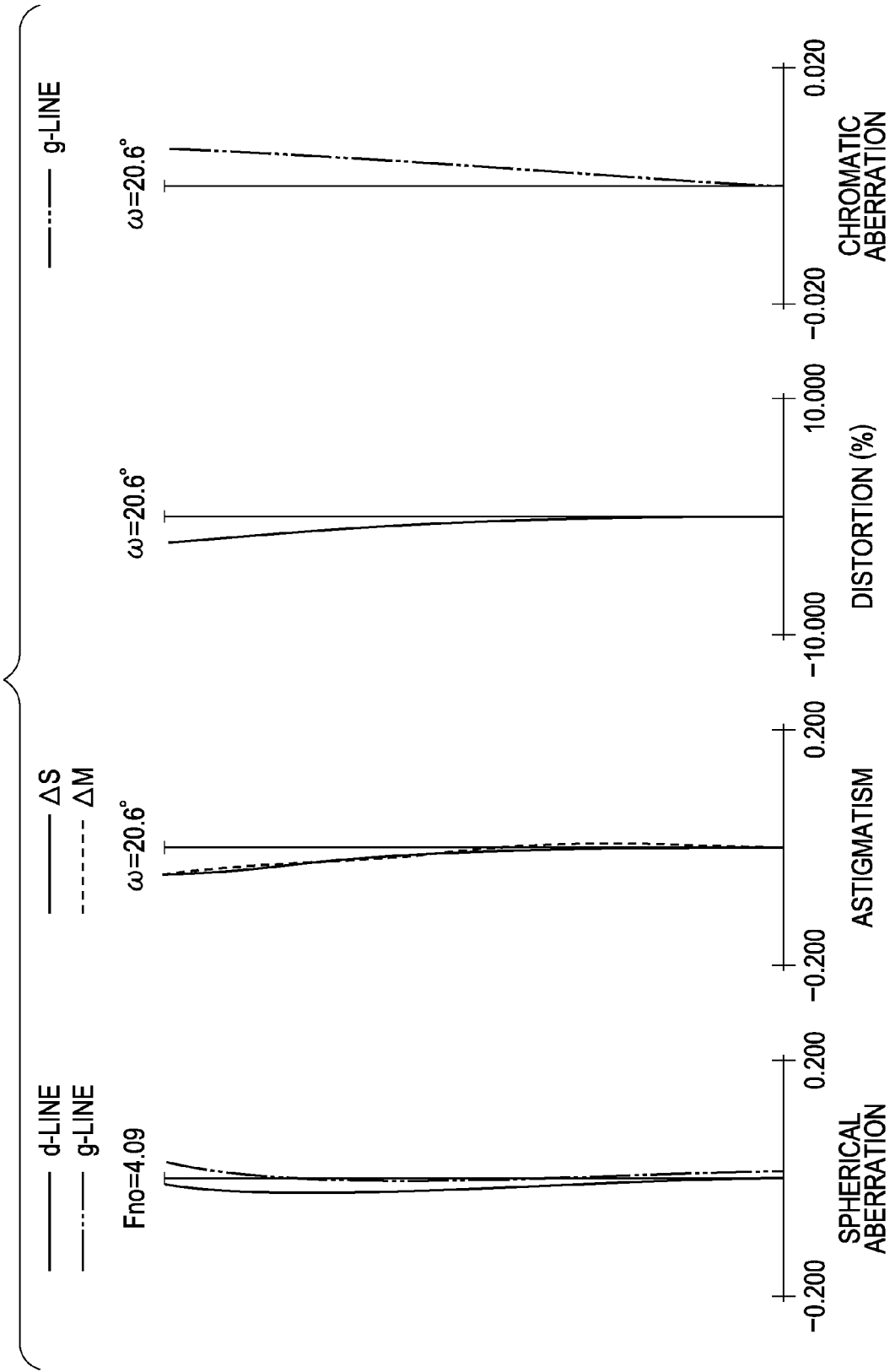

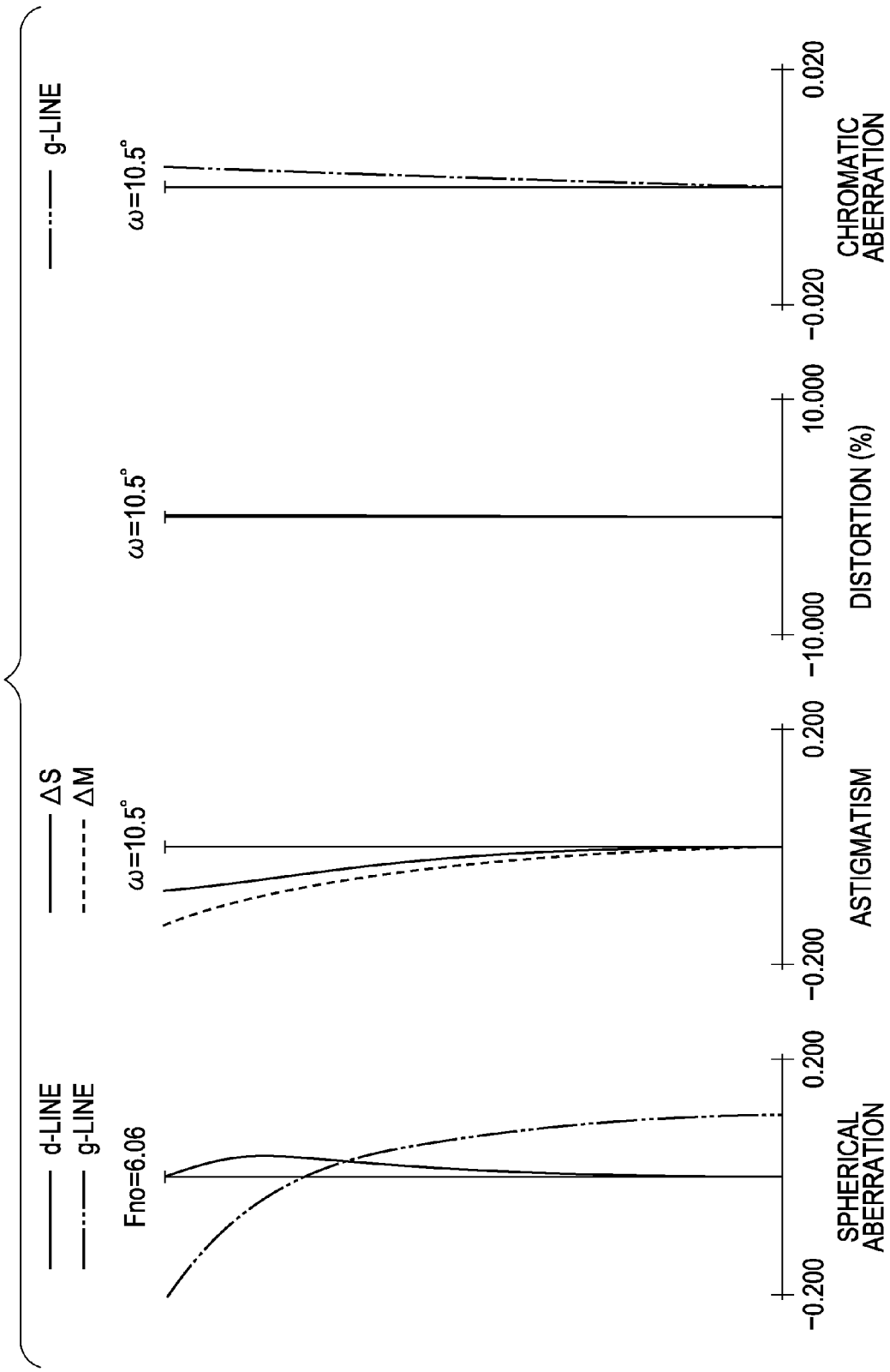

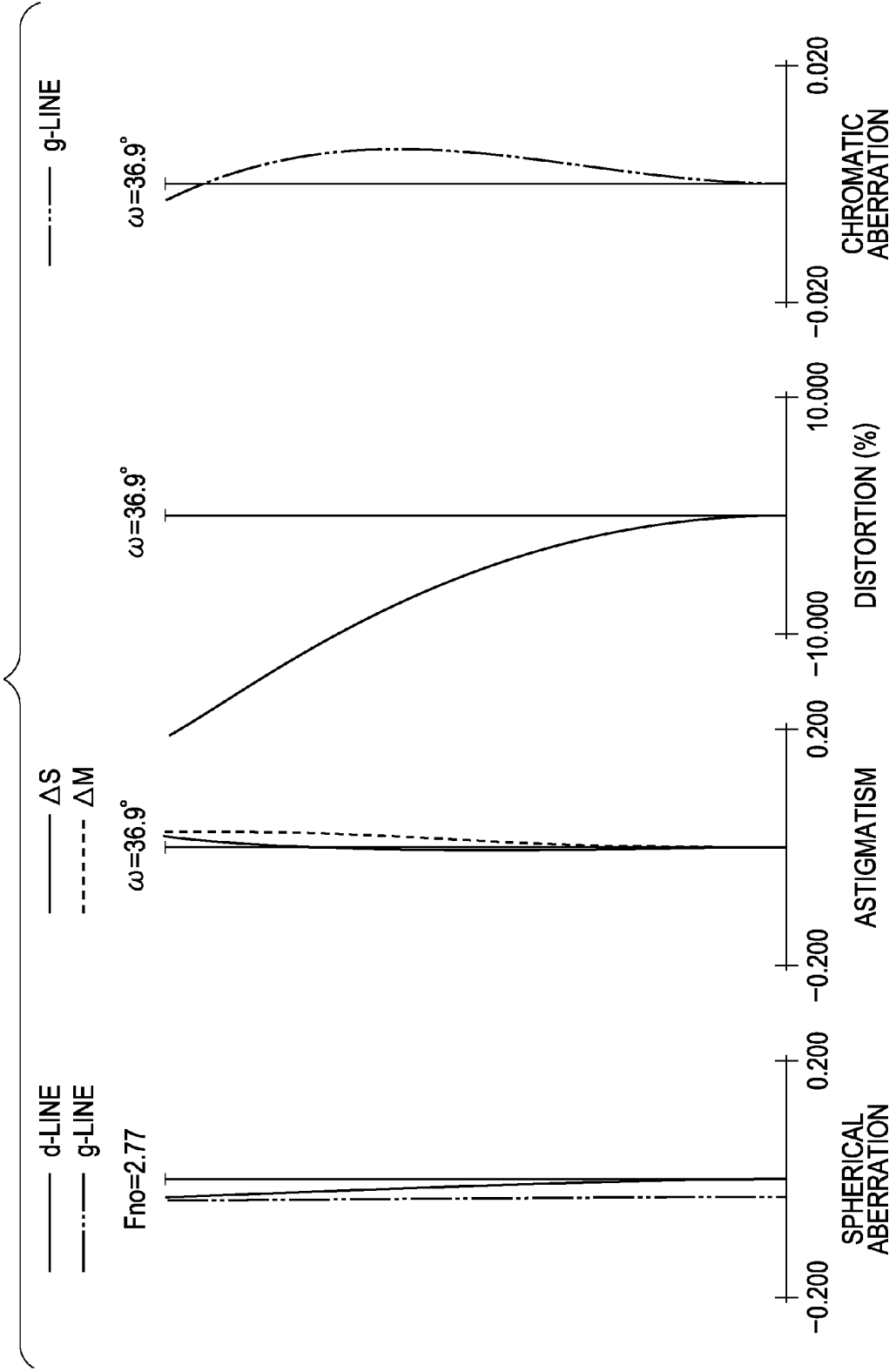

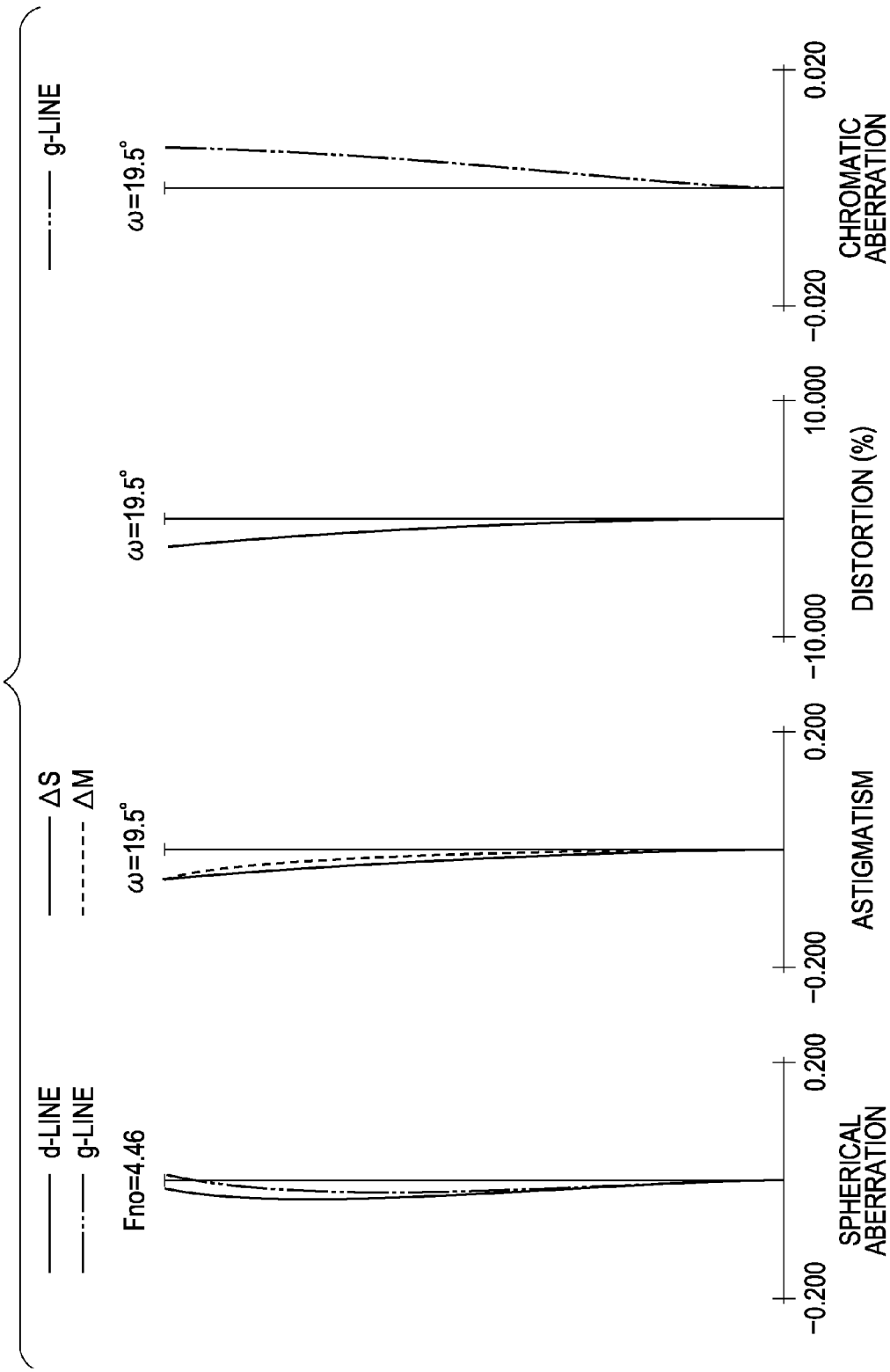

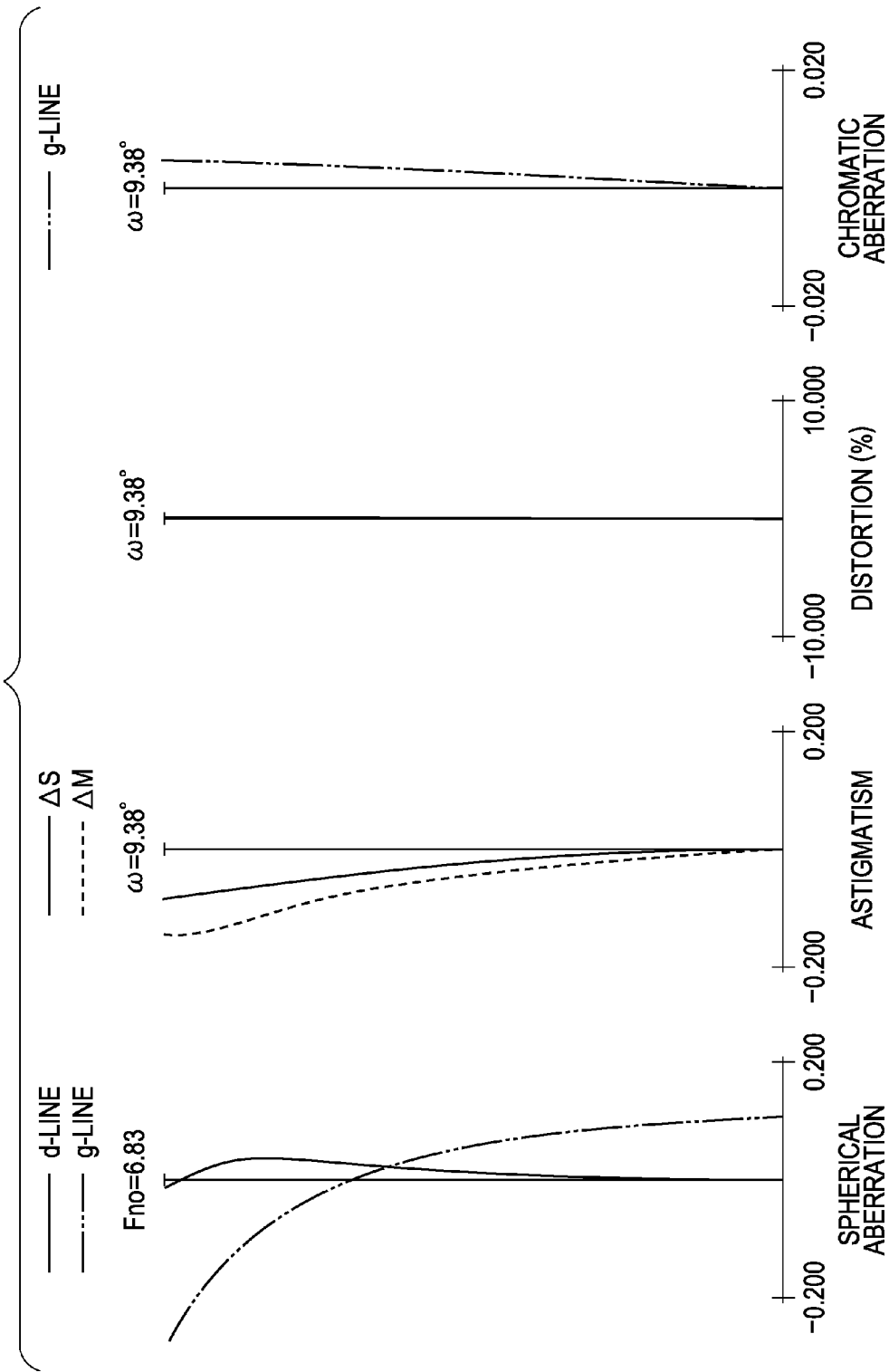

WIDE ANGLE

INTERMEDIATE

TELEPHOTO

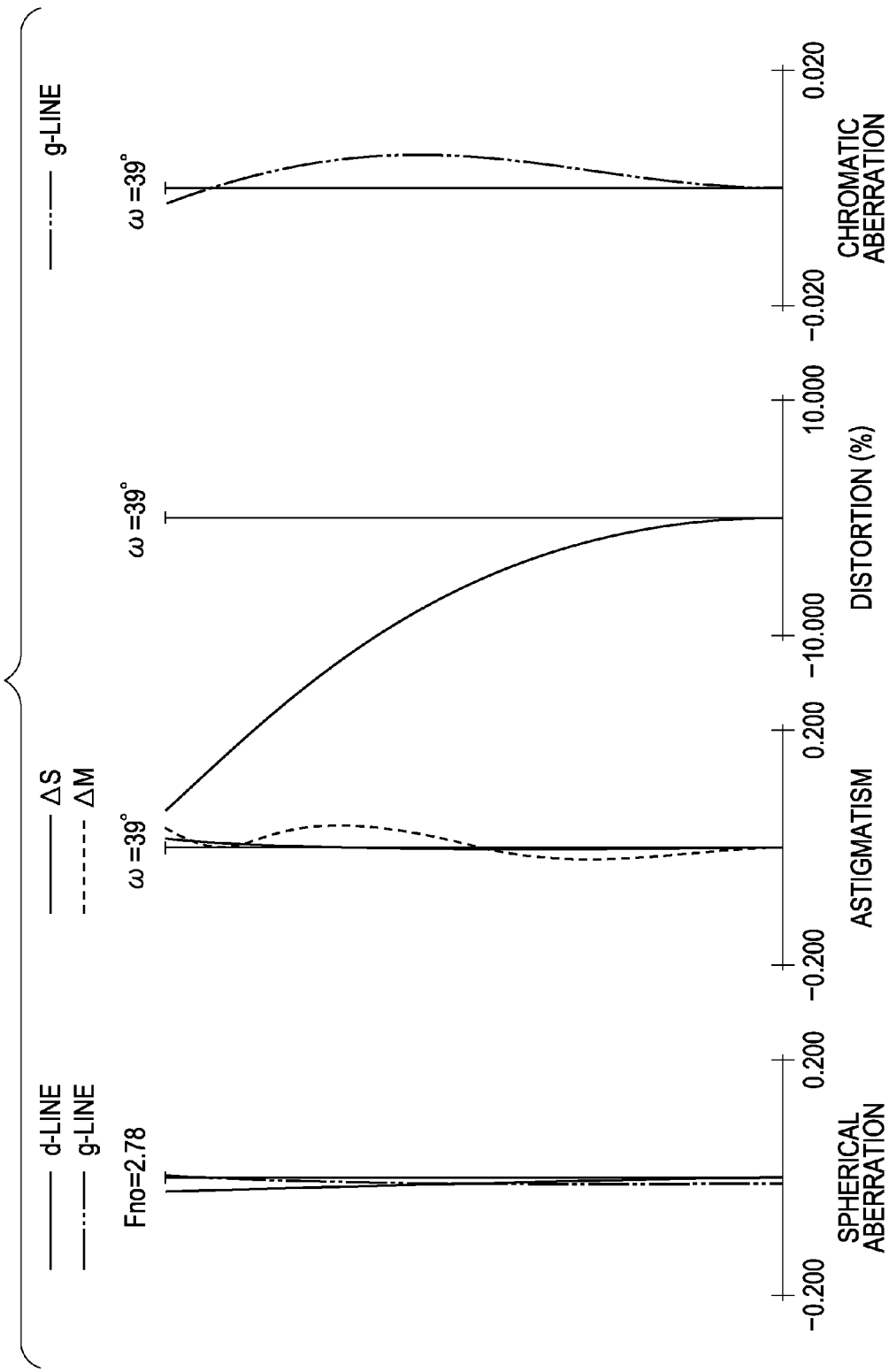

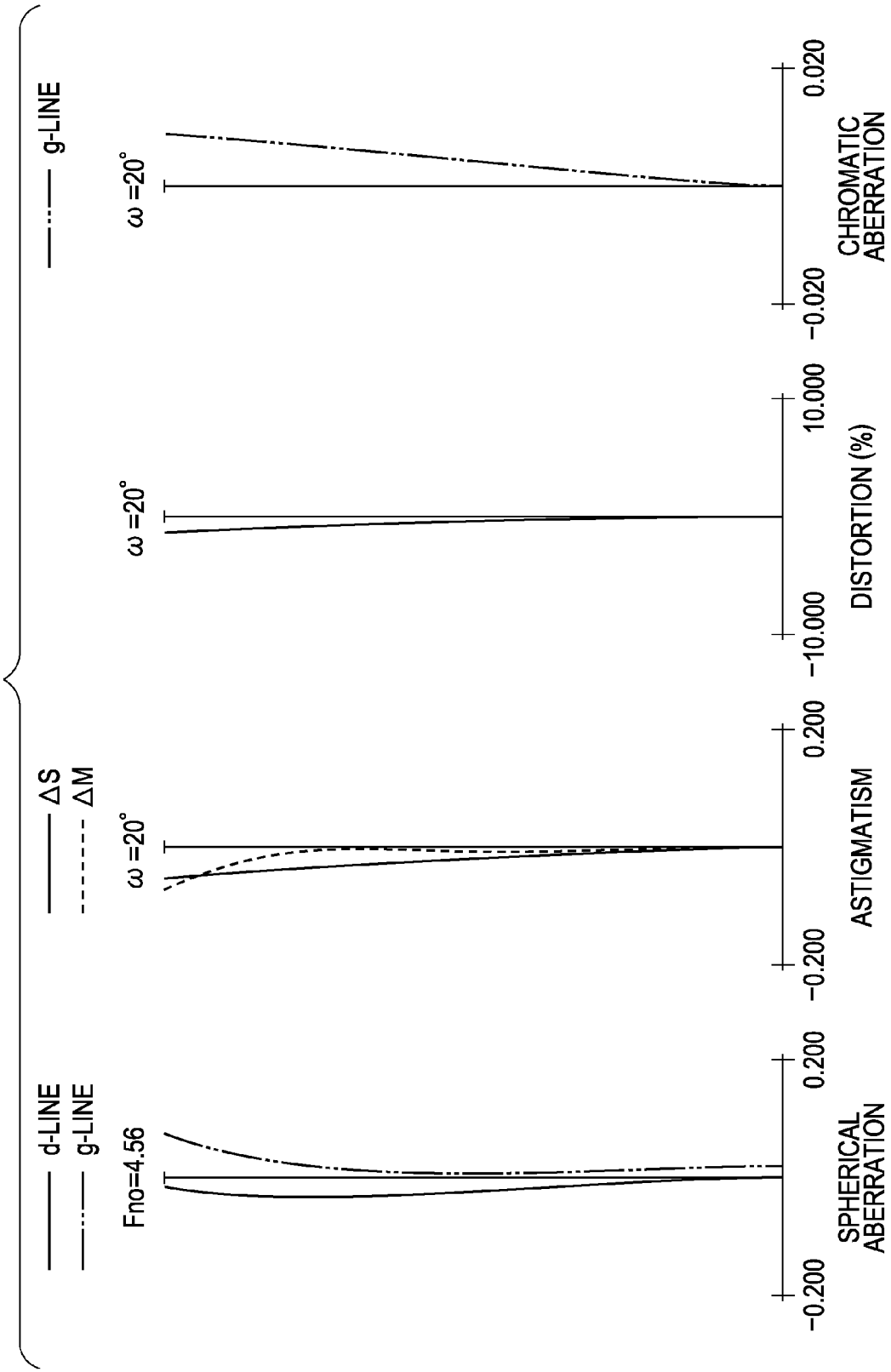

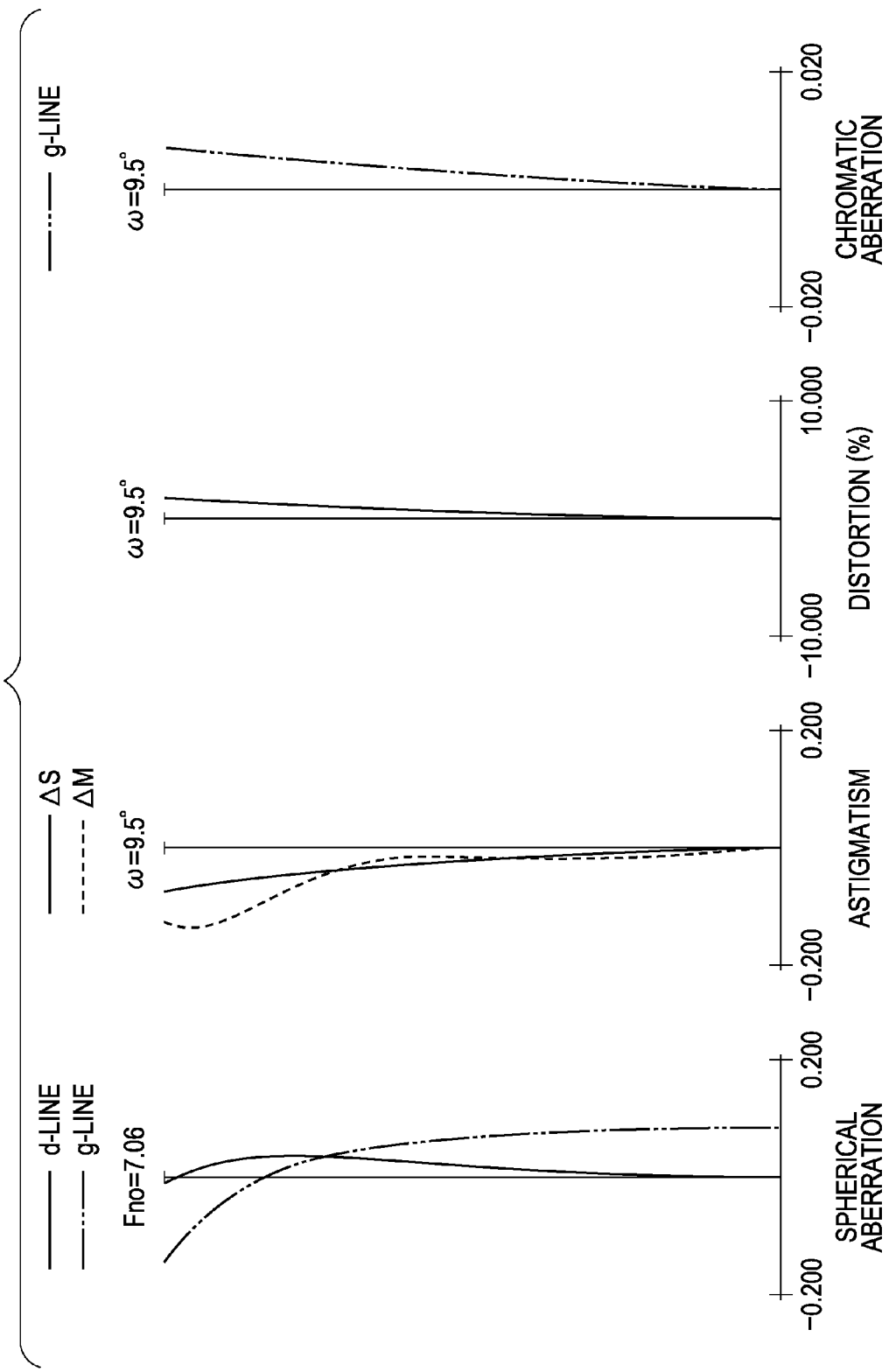

ZOOM LENS AND OPTICAL APPARATUS INCLUDING THE SAME

BACKGROUND OF THE INVENTION

1. Field of the Invention

The present invention relates to an optical apparatus, and more specifically to a zoom lens applicable for use in an optical apparatus such as a digital still camera, a video camera, or a TV camera.

2. Description of the Related Art

Image pickup apparatuses (cameras), such as a video camera and a digital still camera, using a solid-state image pickup element have steadily increased in functionality and decreased in size. As an optical system for use in such image pickup apparatuses, there is a demand for a compact zoom lens having a wide viewing angle, high aperture ratio, and high optical performance.

In a camera using a solid-state image pickup element, a zoom lens should preferably have a relatively long back focus because various optical components, such as a low-pass filter and a color correction filter, are disposed between the rear of the zoom lens and the solid-state image pickup element. In addition, a camera including a solid-state image pickup element for a color image is required to include a zoom lens having a good image-side telecentric characteristic in order to avoid color shading.

A compact zoom lens having a long back focus and a good image-side telecentric characteristic is known. One example is a negative lead type zoom lens in which a lens unit having a negative refractive power is located closest to an object side. More specifically, for example, U.S. Pat. No. 7,023,623 and Japanese Patent Laid-Open No. 2006-208890 disclose three-unit zoom lenses that include, in order from an object side to an image side, a first lens unit having a negative refractive power, a second lens unit having a positive refractive power, and a third lens unit having a positive refractive power and that has a good image-side telecentric characteristic.

In a negative lead type zoom lens including three or more lens units, it is effective to increase the refractive powers of the lens units in order to reduce the total size of the zoom lens and to increase the zoom ratio.

However, if the refractive powers of the lens units are simply increased for a wider viewing angle and a higher zoom ratio, aberration variation during zooming increases. Therefore, it is difficult to achieve high optical performance over the entire zoom range of known negative lead type zoom lenses. Accordingly, to achieve a compact total size, a wide viewing angle, and a high zoom ratio in the negative lead type zoom lens including three or more lens units, it is important to appropriately set the refractive powers of the lens units and moving paths and moving amounts of the lens units during zooming.

For example, if an attempt to reduce the size of the total lens system and to increase the viewing angle is made without appropriately setting the lateral magnification of the second lens unit and the refractive powers of the first and third lens units, optical performance at the wide angle end can be seriously affected in a negative manner. Further, if an attempt to increase the viewing angle and zoom ratio is made without appropriately setting the moving path and moving amount of the first lens unit during zooming, the effective diameter of the lens closest to the object side increases, and this in turn increases the total size of the zoom lens.

SUMMARY OF THE INVENTION

A zoom lens according to an aspect of the present invention includes a first lens unit having a negative refractive power; a second lens unit having a positive refractive power; and a third lens unit having a positive refractive power. The first lens unit, the second lens unit, and the third lens unit are arranged in order from an object side to an image side. The first, second, and third lens units move during zooming. The first lens unit is formed by two lenses, and the third lens unit is formed by one lens. The following conditional expressions are satisfied:

$$-0.58 < \beta 2w < -0.40$$

$$0.30 < |f1/f3| < 0.50$$

$$-3.0 < m1/fw < -1.3$$

where $\beta 2w$ represents a lateral magnification of the second lens unit at a wide angle end, f1 represents a focal length of the first lens unit, f3 represents a focal length of the third lens unit, fw represents a focal length of the entire zoom lens at the wide angle end, m1 represents a moving amount of the first lens unit along an optical axis from the wide angle end to a telephoto end, and a sign of the moving amount is a positive sign when the first lens unit moves towards the image side.

According to the present invention, it is possible to obtain a zoom lens having a compact lens system, a wide viewing angle, a high zoom ratio, and a high optical performance over the entire zoom range.

Further features of the present invention will become apparent to a person of ordinary skill in the art from the following description of exemplary embodiments with reference to the attached drawings.

BRIEF DESCRIPTION OF THE DRAWINGS

FIGS. 2A, 2B, and 2C are aberration diagrams of the zoom lens of the first embodiment, respectively, at the wide angle end, the intermediate zoom position, and the telephoto end.

FIGS. 4A, 4B, and 4C are aberration diagrams of the zoom lens of the second embodiment, respectively, at the wide angle end, the intermediate zoom position, and the telephoto end.

FIGS. 6A, 6B, and 6C are aberration diagrams of the zoom lens of the third embodiment, respectively, at the wide angle end, the intermediate zoom position, and the telephoto end.

DESCRIPTION OF THE EMBODIMENTS

For purposes of the following description, the side of a lens where an object to be imaged is placed is called the object side or front side of the lens; and the side of the lens where the image is formed is called the image side or back side of the lens. Thus, a zoom lens according to the present invention includes a first lens unit having a negative refractive power, a second lens unit having a positive refractive power, and a third lens unit having a positive refractive power. The first lens unit, the second lens unit, and the third lens unit are arranged in order from an object side to an image side. The first, second, and third lens units move during zooming. In the zoom lens of the present invention, a lens unit having a refractive power may be provided on an object side of the first lens unit or an image side of the third lens unit.

Figure 1A:
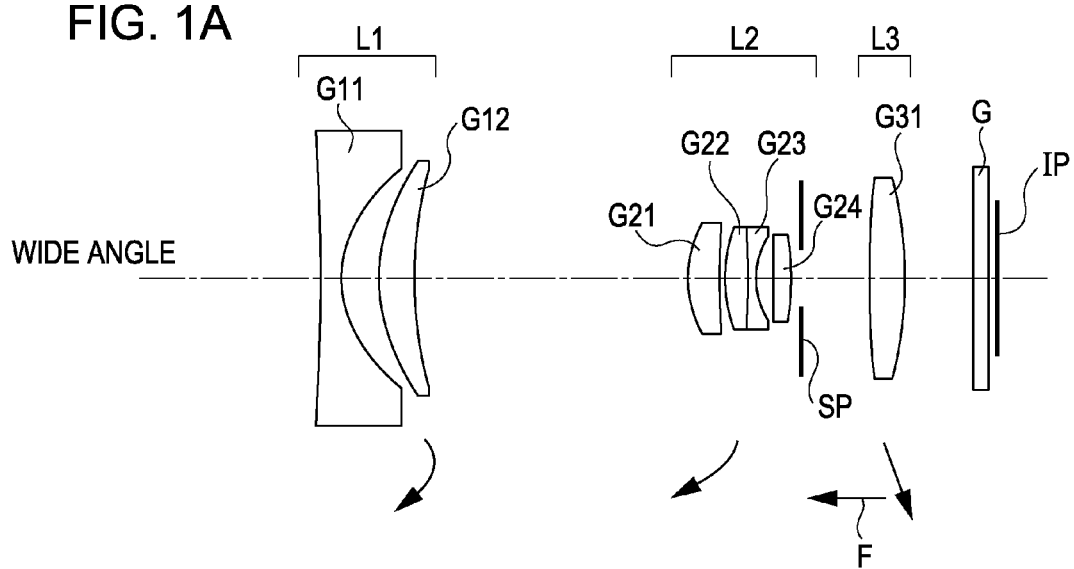
FIGS. 1A, 1B, and 1C are cross-sectional views of lenses in a zoom lens according to a first embodiment, respectively, at a wide angle end, an intermediate zoom position, and a telephoto end.
Figure 1B:
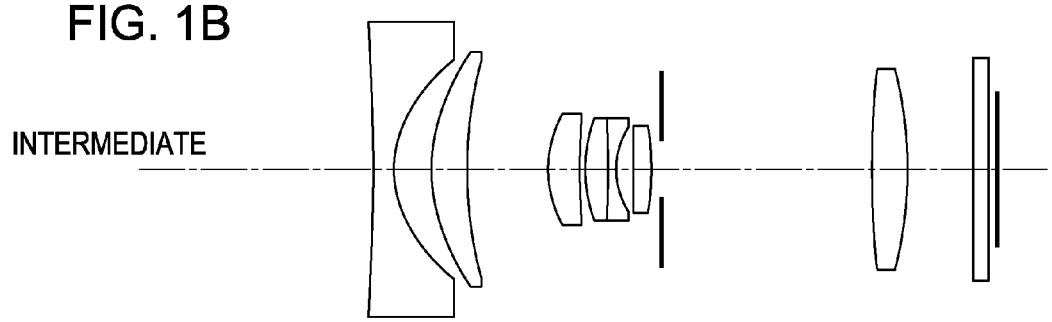
Figure 1C:
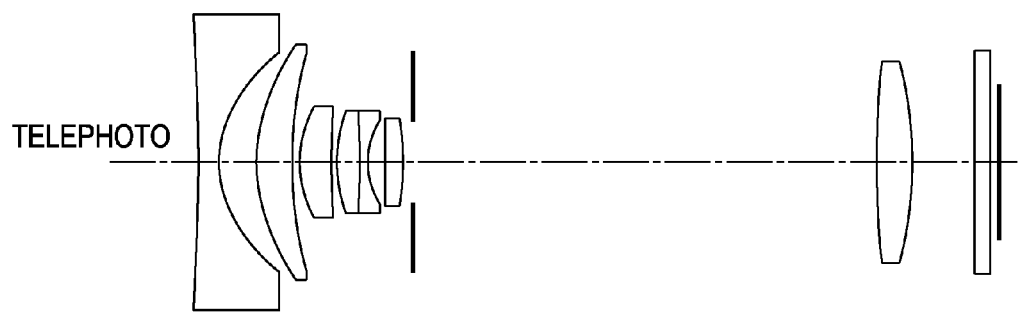
Figure 3A:
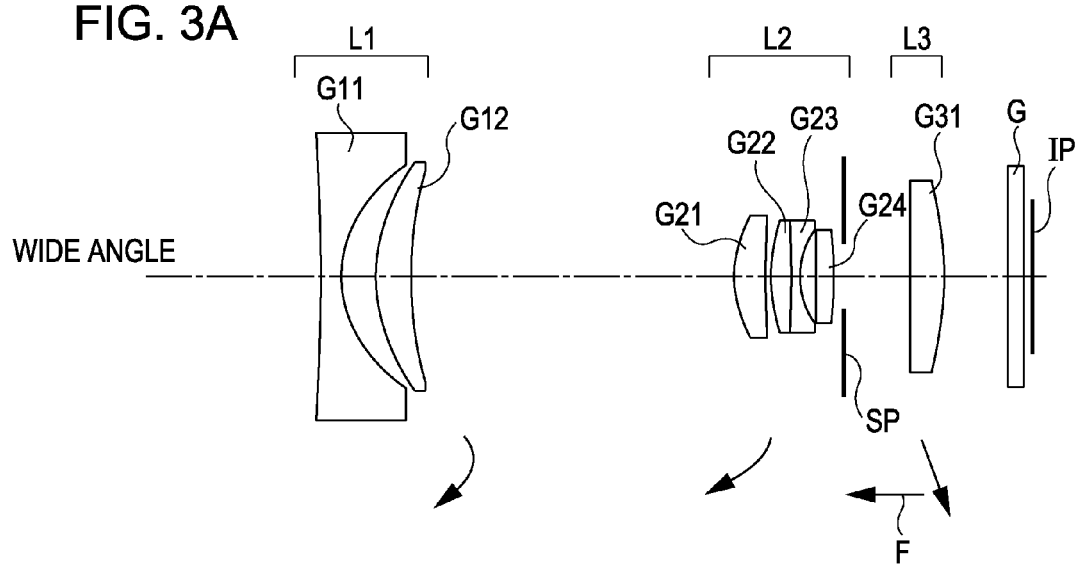
FIGS. 3A, 3B, and 3C are cross-sectional views of lenses in a zoom lens according to a second embodiment, respectively, at a wide angle end, an intermediate zoom position, and a telephoto end.
Figure 3B:
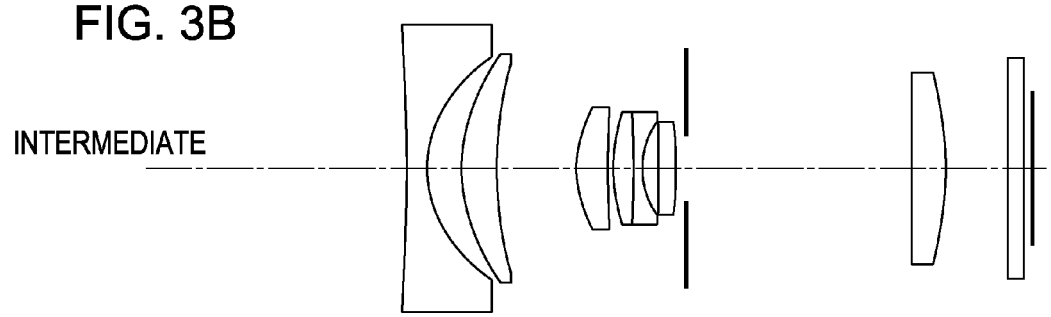
Figure 3C:
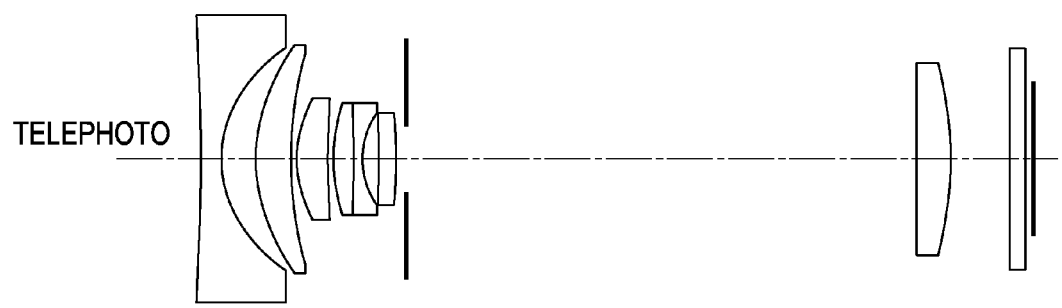
Figure 5A:
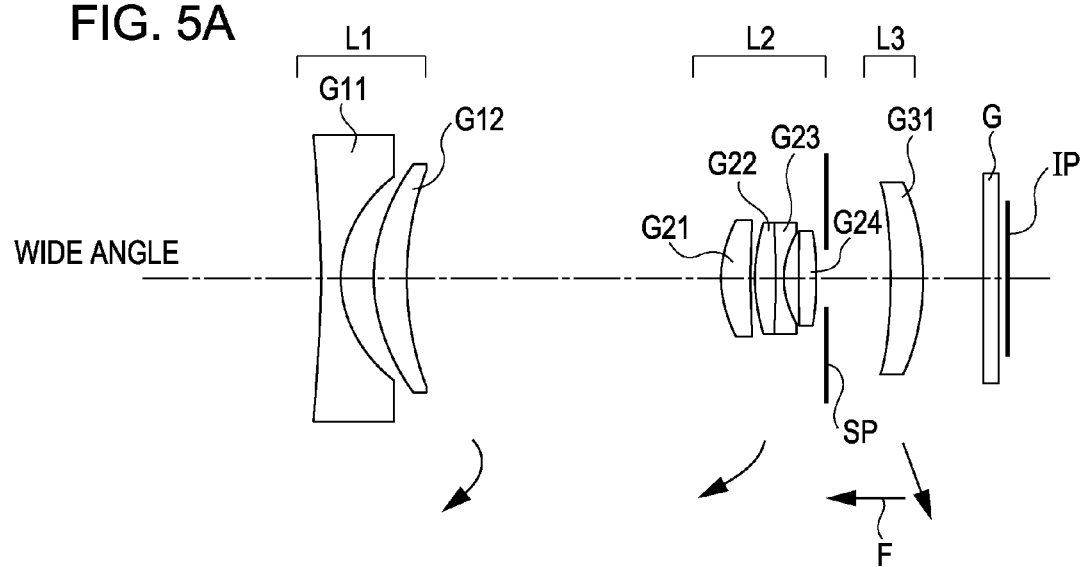
FIGS. 5A, 5B, and 5C are cross-sectional views of lenses in a zoom lens according to a third embodiment, respectively, at a wide angle end, an intermediate zoom position, and a telephoto end.
Figure 5B:
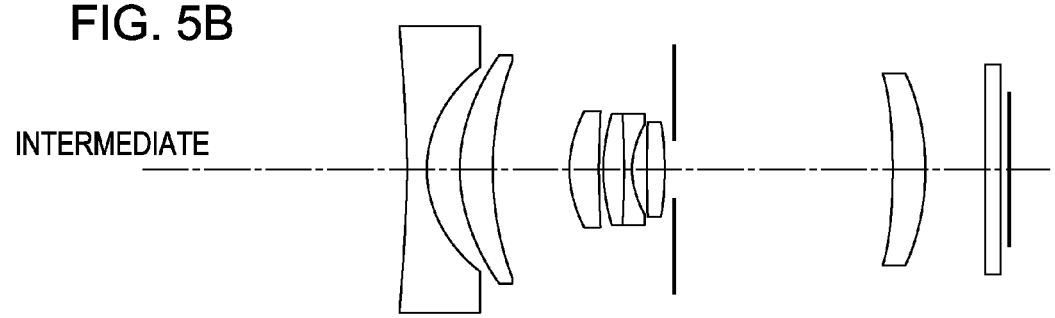
Figure 5C:
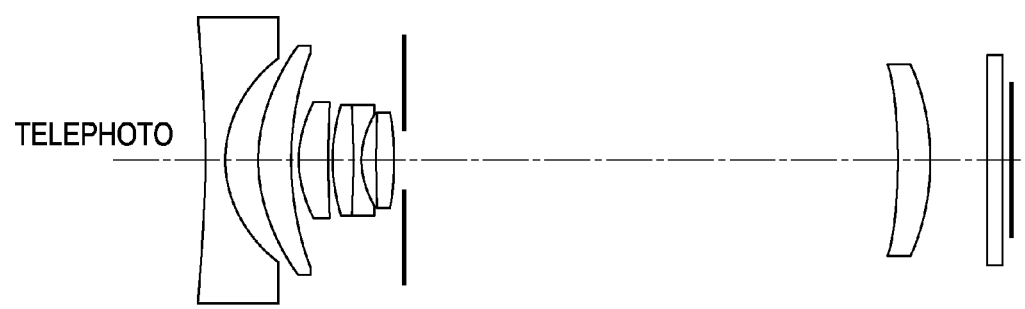

FIGS. 1A, 1B, and 1C are cross-sectional views of lenses in a zoom lens according to a first embodiment, respectively, at a wide angle end (short focal-length end), an intermediate zoom position, and a telephoto end (long focal-length end). FIGS. 2A, 2B, and 2C are aberration diagrams of the zoom lens of the first embodiment, respectively, at the wide angle end, the intermediate zoom position, and the telephoto end. The zoom lens of the first embodiment has a zoom ratio of about 4.71 and an aperture ratio of about 2.88 to 6.06. FIGS. 3A, 3B, and 3C are cross-sectional views of lenses in a zoom lens according to a second embodiment, respectively, at a wide angle end, an intermediate zoom position, and a telephoto end. FIGS. 4A, 4B, and 4C are aberration diagrams of the zoom lens of the second embodiment, respectively, at the wide angle end, the intermediate zoom position, and the telephoto end. The zoom lens of the second embodiment has a zoom ratio of about 5.86 and an aperture ratio of about 2.77 to 6.83. FIGS. 5A, 5B, and 5C are cross-sectional views of lenses in a zoom lens according to a third embodiment, respectively, at a wide angle end, an intermediate zoom position, and a telephoto end. FIGS. 6A, 6B, and 6C are aberration diagrams of the zoom lens of the third embodiment, respectively, at the wide angle end, the intermediate zoom position, and the telephoto end. The zoom lens of the third embodiment has a zoom ratio of about 6.24 and an aperture ratio of about 2.78 to 7.06.

Figure 7:
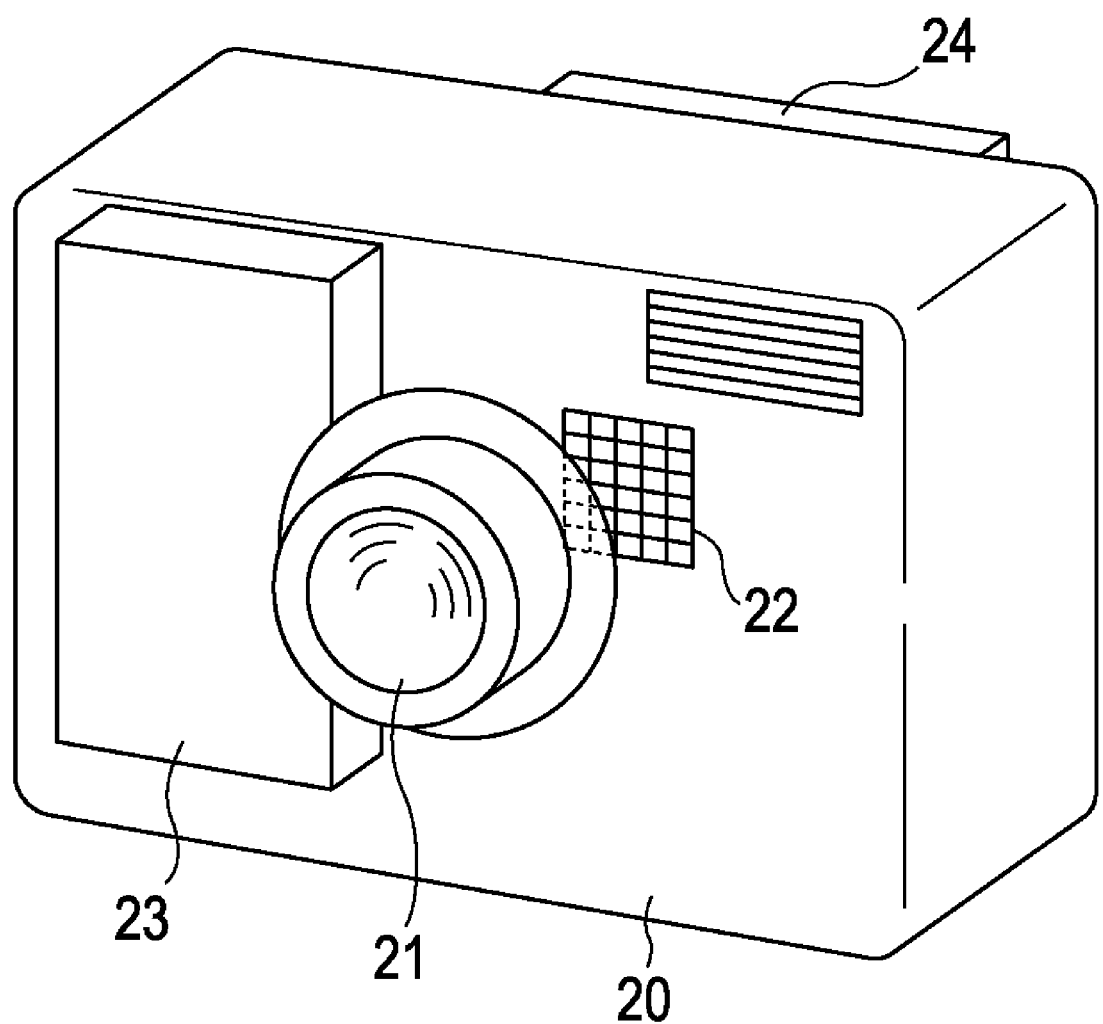
FIG. 7 is a schematic view illustrating the certain relevant parts of an image pickup apparatus according to the present invention.

FIG. 7 is a schematic view illustrating an exemplary embodiment of an image pickup apparatus including a zoom lens according to the present invention. The zoom lenses of the exemplary embodiments are described herein as imaging lens systems for use in image pickup apparatuses, but the present invention is not limited thereto. That is, the zoom lenses described in the exemplary embodiments may also find use in other optical applications, such as magnifying or focusing apparatuses (e.g., microscopes, telescopes or projection devices), apparatuses for focusing and aligning optical signals (e.g., in optical communications), or the like. In the lens cross-sectional views, the left side is an object side (front side), and the right side is an image side (rear side). When the zoom lenses of the embodiments are used in optical apparatuses such as a projector, the left side is a screen side, and the right side is a projection image side.

In the lens cross-sectional views, L1 represents a first lens unit having a negative refractive power (optical power=the reciprocal of the focal length), L2 represents a second lens unit having a positive refractive power, and L3 represents a third lens unit having a positive refractive power. An f-number determining member SP functions as an aperture stop that determines (limits) an open f-number (Fno) light beam. Thus, the f-number determining member SP hereinafter is also referred to as an aperture stop. An optical block G corresponds to an optical filter, a face plate, a crystal low-pass filter, and an infrared cut-off filter. When the zoom lens is used as an imaging optical system of a video camera or a digital still camera, an image plane IP corresponds to an image pickup surface of a solid-state image pickup element (photoelectric conversion element), such as a CCD sensor or a CMOS sensor.

In spherical aberration diagrams of the aberration diagrams, a d-line and a g-line are shown, and Fno represents the f-number. In astigmatism diagrams, $\Delta M$ and $\Delta S$ respectively represent a meridional image plane and a sagittal image plane. Lateral chromatic aberration is represented by the g-line, and $\omega$ represents the half field angle. In the following embodiments, the wide angle end and the telephoto end refer to zoom positions provided when the zooming lens unit (second lens unit L2) is positioned at opposite ends of a mechanical movable range on the optical axis. In the lens cross-sectional views, arrows indicate moving paths of the lens units during zooming from the wide angle end to the telephoto end.

In the embodiments, in case of zooming from the wide angle end to the telephoto end, the first lens unit L1 substantially reciprocates towards and from the image side along a part of a convex path so as to correct an image plane variation due to zooming, and the second lens unit L2 monotonously moves to the object side so as to perform main zooming. The third lens unit L3 moves to the image side. In this case, the lens units move during zooming from the wide angle end to the telephoto end so that the distance between the first lens unit L1 and the second lens unit L2 decreases and the distance between the second lens unit L2 and the third lens unit L3 increases. Focusing from an object at infinity to a near object is performed by moving the third lens unit L3 towards the object side. The F-number determining member SP is provided on the image side of the second lens unit L2, and moves together with the second lens unit L2 during zooming.

Next, a description will be given of characteristics of the lens configurations of the zoom lenses of the embodiments. In general, when a negative lead type zoom lens in which a lens unit having a negative refractive power leads is selected as a compact zoom lens having a wide viewing angle, the rear principal point can be located on the image side, and a long back focus can be obtained easily. To realize a zoom lens having a good image-side telecentric characteristic, it is preferable that a lens unit closest to the image pickup element (image plane) should have a positive refractive power and function as a field lens. The zoom lenses of the embodiments include, in order from the object side to the image side, at least three lens units, that is, the first lens unit L1 having a negative refractive power, the second lens unit L2 having a positive refractive power, and a third lens unit L3 having a positive refractive power. During zooming, the lens units move. Further, the following three structures are considered to realize a high optical performance over the entire zoom range while ensuring a compact size and a high zoom ratio.

A focal length fw of the entire three-unit zoom lens at the wide angle end is given by the following expression:

$$fw = f1 \times \beta 2w \times \beta 3w$$

where f1 represents the focal length of the first lens unit L1, and $\beta 2w$ and $\beta 3w$ represent lateral magnifications of the second and third lens units L2 and L3 at the wide angle end. This expression shows that it is important to appropriately set the focal length f1 of the first lens unit L1 and the lateral magnification of the second lens unit L2 in order to shorten the focal length at the wide angle end and to increase the viewing angle of the entire zoom lens. Accordingly, in the embodiments, a first one of the three structures is to appropriately set the refractive power of the first lens unit L1. In general, when the viewing angle of the zoom lens increases, the front-unit effective diameter increases. Since the front-unit effective diameter is determined by the height of an off-axis light beam passing through the first lens unit L1, a wider viewing angle and a smaller size can be achieved by appropriately setting the refractive power of the first lens unit L1 so as to sufficiently refract the off-axis light beam.

A second structure is to appropriately set the lateral magnification $\beta 2w$ of the second lens unit L2 at the wide angle end. In general, if the refractive power of the first lens unit L1 is excessively increased for a wider viewing angle and a smaller size of the zoom lens, the Petzval sum increases to the minus side, and in particular, curvature of field increases at the wide angle end. Accordingly, the focal length fw can be easily reduced by setting the lateral magnification $\beta 2w$ at a somewhat small value. However, if the lateral magnification $\beta 2w$ is excessively decreased, the imaging magnification of the second lens unit L2 excessively increases, and this undesirably increases the number of lenses that constitute the second lens unit L2.

A third structure is to approximately set the moving amount of the first lens unit L1 during zooming. In general, the position of the third lens unit L3 on the optical axis rarely changes between the wide angle end and the telephoto end. To reduce the total length of the three-unit zoom lens, with a paraxial analysis of the condition that the total length at the wide angle end is equal to that at the telephoto end, it is shown that the lateral magnifications $\beta 2w$ and $\beta 2T$ of the second lens unit L2 at the wide angle end and the telephoto end are preferably set as follows:

$\beta 2w = 1/\sqrt{Z}$ $\beta 2T = \sqrt{Z}$ $Z = fT/fw$ where the total lens length refers to the length from the first lens surface to the final lens surface. In this case, during zooming from the wide angle end to the telephoto end, the first lens unit L1 moves along a path such as to move to the image side from the wide angle eng to an intermediate zoom position and to then move to the object side so as to reach the telephoto end. However, when the aperture stop SP is close to the second lens unit L2, if the lateral magnifications of the second lens unit L2 are set, as described above, the distance between the first lens unit L1 and the second lens unit L2 at the wide angle end excessively increases, and the front-unit effective diameter increases when the viewing angle is increased. If the front-unit effective diameter is forced to increase in this situation, the refractive power of the L1 needs to be excessively increased. As a result, the Petzval sum is excessive on the minus side and curvature of field increases. Hence, to achieve both a wider viewing angle and a smaller size, it is necessary to decrease the distance between the first lens unit L1 and the aperture stop SP at the wide angle end. Accordingly, in the embodiments, the moving amount of the first lens unit L1 during zooming is appropriately set so as to increase the zoom ratio while preventing the front-unit effective diameter from being increased by the increase in viewing angle.

In the embodiments, a compact zoom lens having a wide viewing angle and a high zoom ratio is realized by satisfying the above-described three conditions. More specifically, a compact zoom lens having a wide viewing angle and a high zoom ratio is realized by simultaneously satisfying the following Conditional Expressions (1) to (3):

$-0.58 < \beta 2w < -0.40$ (1)

$0.30 < |f1/f3| < 0.50$ (2)

$-3.0 < m1/fw < -1.3$ (3)

where $\beta 2w$ represents the lateral magnification of the second lens unit L2 at the wide angle end, f1 represents the focal length of the first lens unit L1, f3 represents the focal length of the third lens unit L3, fw represents the focal length of the entire zoom lens at the wide angle end, and m1 represents the moving amount of the first lens unit L1 along the optical axis from the wide angle end to the telephoto end. The sign of the moving amount is a positive sign when the first lens unit L1 moves to the image side during zooming from the wide angle end to the telephoto end.

Conditional Expression (1) specifies the lateral magnification of the second lens unit L2. When the value exceeds the upper limit in Conditional Expression (1), for example, when the lateral magnification $\beta 2w$ is $-0.30$, it is too high, that is, the refractive power of the second lens unit L2 excessively increases. As a result, it is difficult to properly correct spherical aberration and coma aberration particularly at the telephoto end. In contrast, when the value falls below the lower limit in Conditional Expression (1), for example, when the lateral magnification $\beta 2w$ of the second lens unit L2 is $-0.7$, it is too low, that is, the refractive power of the second lens unit L2 excessively decreases. As a result, to obtain a desired zoom ratio, the moving amount of the second lens unit L2 serving as a variator increases, and it is therefore difficult to reduce the total length of the camera in a retracted state.

Conditional Expression (2) specifies the ratio of the refractive powers of the first lens unit L1 and the third lens unit L3. When the value exceeds the upper limit in Conditional Expression (2), the negative focal length of the first lens unit L1 is long, that is, the refractive power of the first lens unit L1 is too weak, so that reduction of the front-unit effective diameter is difficult. In contrast, when the value falls below the lower limit in Conditional Expression (2), the negative focal length of the first lens unit L1 is short, that is, the refractive power of the first lens unit L1 is too strong, so that the Petzval sum increases to the minus side, and curvature of field increases particularly at the wide angle end.

Conditional Expression (3) specifies the moving amount of the first lens unit L1 during zooming. When the value exceeds the upper limit in Conditional Expression (3), the moving amount of the first lens unit L1 excessively increases, and the thickness of the camera in the retracted state undesirably increases. In contrast, when the value falls below the lower limit in Conditional Expression (3), the moving amount of the first lens unit L1 excessively decreases. If the viewing angle is increased in this state, the distance between the first lens unit L1 and the second lens unit L2 at the wide angle end is too long, and this increases the front-unit effective diameter. It is more preferable to set the numerical ranges in Conditional Expressions (1) to (3) as follows:

$-0.58 < \beta 2w < -0.45$ (1a)

$0.35 < |f1/f3| < 0.50$ (2a)

$-2.0 < m1/fw < -1.3$ (3a)

As described above, according to the embodiments, a compact zoom lens having a wide viewing angle, a high zoom ratio, and a high optical performance is achieved by optimizing the lateral magnification of the second lens unit L2, the refractive powers of the lens units, and the moving amount of the first lens unit L1. According to the embodiments, a compact zoom lens having a wide viewing angle and a high optical performance over the entire zoom lens is obtained by specifying the factors, as described above. It is more preferable to satisfy at least one of the following conditions:

$4.5 < \beta 2T/\beta 2w < 7.0$ (4)

$0.30 < f2/f3 < 0.45$ (5)

$0.7 < (G1R1+G1R2)/(G1R1-G1R2) < 1.0$ (6)

$4.0 < f3/fw < 10.0$ (7)

where β2T represents the lateral magnification of the second lens unit L2 at the telephoto end, f2 represents the focal length of the second lens unit L2, and G1R1 and G1R2 represent the radii of curvature of an object-side lens surface and an image-side lens surface of the lens closest to the object side in the first lens unit L1.

Conditional Expression (4) specifies the change in lateral magnification of the second lens unit L2 during zooming. When the value exceeds the upper limit in Conditional Expression (4), the change in lateral magnification of the second lens unit L2 is too large. If the change in lateral magnification of the second lens unit L2 is too large, when the refractive power of the second lens unit L2 is fixed, the moving amount of the second lens unit L2 increases, and therefore, the retracted length increases undesirably. When the moving amount of the second lens unit L2 is fixed, the refractive power of the second lens unit L2 excessively increases, and it is difficult to correct spherical aberration and coma aberration particularly at the telephoto end. In contrast, when the value falls below the lower limit in Conditional Expression (4), the change in lateral magnification of the second lens unit L2 is too small. When the change in lateral magnification of the second lens unit L2 is thus too small, it is difficult to obtain a desired zoom ratio.

Conditional Expression (5) specifies the refractive power of the second lens unit L2. When the value exceeds the upper limit in Conditional Expression (5), the focal length of the second lens unit L2 is long, that is, the refractive power of the second lens unit L2 is small. Hence, to obtain a desired high zoom ratio, there is a need to increase the moving amount of the second lens unit L2 during zooming. This undesirably increases the total lens length (length from the first lens surface to the image plane) at the telephoto end. In contrast, when the value falls below the lower limit in Conditional Expression (5), the focal length of the second lens unit L2 is short, that is, the refractive power of the second lens unit L2 is large, and it is therefore difficult to correct spherical aberration and coma aberration over the entire zoom range.

Conditional Expression (6) specifies the shape factor (lens shape) of the negative lens closest to the object side in the first lens unit L1. For example, the value in Conditional Expression (6) is 1.0, this means that an object-side lens surface of the negative lens in the first lens unit L1 is planar and an image-side lens surface is plano-concave. When the value exceeds the upper limit in Conditional Expression (6) and the meniscus degree is too high, it is difficult to correct curvature of field particularly at the wide angle end. In contrast, when the value falls below the lower limit in Conditional Expression (6) and, for example, the shape factor is 0.5, the negative lens in the first lens unit L1 is biconcave. In this case, since the radii of curvature of both the object-side and image-side lens surfaces excessively increase, the thickness of a peripheral portion of the negative lens increases. This undesirably increases the thickness of the camera in a retracted state.

Conditional Expression (7) specifies the refractive power (the reciprocal of the focal length f3) of the third lens unit L3. When the value exceeds the upper limit in Conditional Expression (7), the refractive power of the third lens unit L3 is too small, and therefore, the telecentric characteristic is not good. In contrast, when the value falls below the lower limit in Conditional Expression (7), the refractive power of the third lens unit L3 is too large, and this undesirably increases focus variation. It is more preferable to set the numerical ranges in Conditional Expressions (4) to (7) as follows:

$$4.5 < \beta2T/\beta2w < 6.5 \quad (4a)$$

$$0.32 < f2/f3 < 0.45 \quad (5a)$$

$$0.8 < (G1R1+G1R2)/(G1R1-G1R2) < 0.9 \quad (6a)$$

$$4.0 < f3/fw < 8.0 \quad (7a)$$

A description will be given of lens configurations of the embodiments. In the embodiments, the first lens unit L1 having a negative reflective power is formed by two lenses, that is, includes, in order from the object side to the image side, a biconcave negative lens G11 and a meniscus positive lens G12 having a convex surface on the object side. Since the amount of refraction of the off-axis light beam at the first lens unit L1 at the wide angle end is large, various off-axial aberrations, in particular, astigmatism and distortion easily occur. Accordingly, in the embodiments, the first lens unit L1 is formed by the negative lens G11 and the positive lens G12 so as to suppress the increase in effective diameter of the lens closest to the object side. The first lens unit L1 is formed by two lenses and both the lenses are formed of a lens material having a high refractive index, thereby reducing the curvatures of the lens surfaces and suppressing curvature of field. Further, the negative lens G11 is formed of a low-dispersion lens material and the positive lens G12 is formed of a high-dispersion lens material so as to properly correct longitudinal chromatic aberration at the telephoto end and lateral chromatic aberration at the wide angle end. In addition, both the object-side and image-side surfaces of the biconcave negative lens G11 are aspherical such that the negative refractive power decreases from the lens center to the lens periphery.

With the above-described configuration, astigmatism and distortion are corrected in a well-balanced manner, and the first lens unit L1 is formed by only two lenses so as to reduce the total size of the zoom lens. The second lens unit L2 having a positive refractive power is formed by four lenses, that is, includes, in order from the object side to the image side, a positive lens G21 having a convex surface on the object side, a cemented lens of a biconvex positive lens G22 and a biconcave negative lens G23, and a biconvex positive lens G24. The height of the off-axis light beam is the highest at the positive lens G21 closest to the object side, and the positive lens G21 is closely relevant mainly to the occurrence of spherical aberration and coma aberration. Accordingly, in the embodiments, the object-side lens surface of the positive lens G21 closest to the object size is made aspherical such that the positive refractive power decreases from the lens center to the lens periphery, thereby properly correcting spherical aberration and coma aberration. Since the off-axis light beam passes through the second lens unit L2 over the entire zoom lens, the second lens unit L2 includes the cemented lens of the positive lens G22 and the negative lens G23 in order to correct longitudinal chromatic aberration.

The cemented lens includes the positive lens and the negative lens in order from the object side to the image side, the lens effective diameter of the second lens unit L2 is reduced, the negative lens G23 is placed at a position where the position of off-axis light beam is the lowest, so that aberrations are corrected easily. Further, the positive lens G24 is placed closest to the image side in the second lens unit L2 in order to increase the exit angle of the off-axis light beam from the second lens unit L2. The third lens unit L3 having a positive refractive power functions as a field lens for ensuring an image-side telecentric characteristic, and is formed by one positive lens G31 so as to reduce the axial lens thickness. Moreover, the third lens unit L3 is a focusing lens unit, and moves from the image side to the object side during focusing from an object at infinity to a near object. By appropriately setting the position sensitivity for focusing, the focusing speed is increased. Further, in order to reduce curvature of field particularly at the telephoto end, the object-side lens surface is made aspherical such that the positive refractive power decreases from the lens center to the lens periphery. By forming the lens units, as described above, the total size of the zoom lens is reduced while maintaining a high optical performance.

Numerical examples of the present invention will now be described. In the numerical examples, i represents the order number of the lens surface from the object side, ri represents the radius of curvature of the lens surface, di represents the lens thickness and air gap between the i-th lens surface and the i+1-th lens surface, and ndi and vdi respectively represent the refractive index and the Abbe number for the d-line. Further, "*" indicates that the lens surface is aspherical. Two surfaces closest to the image side are formed by glass materials such as face plates. Further, k, A4, A6, A8, and A10 are aspherical coefficients. The aspherical shape is given by the following expression:

$$x = (h^2/R)/[1+\{1-(1+k)(h/R)^2\}^{1/2}] + A4 \cdot h^4 + A6 \cdot h^6 + A8 \cdot h^8 + A10 \cdot h^{10}$$

where x represents the displacement in the optical axis direction at a height h from the optical axis with reference to the vertex of the surface. In the above expression, R represents the paraxial radius of curvature, and a back focus BF represents the distance from a surface 17 of the glass material closest to the image side. The relationships between the above-described conditional expressions and the numerical examples are shown in Table 1.

First Numerical Example

Unit: mm
Surface Data

| Surface No. | r | d | nd | vd |
|---|---|---|---|---|
| 1* | −70.635 | 1.05 | 1.84954 | 40.1 |
| 2* | 5.476 | 1.81 | | |
| 3 | 9.457 | 1.70 | 1.92286 | 18.9 |
| 4 | 20.952 (variable) | | | |
| 5* | 5.724 | 1.56 | 1.84954 | 40.1 |
| 6 | 75.396 | 0.20 | | |
| 7 | 7.154 | 1.10 | 1.69680 | 55.5 |
| 8 | −38.616 | 0.40 | 1.80518 | 25.4 |
| 9 | 3.768 | 0.81 | | |
| 10 | 61.821 | 0.90 | 1.69680 | 55.5 |
| 11 | −16.566 | 0.50 | | |
| 12 (stop) | ∞ | 0.00 | | |
| 13 | ∞ (variable) | | | |
| 14* | 53.898 | 1.70 | 1.69350 | 53.2 |
| 15 | −19.698 (variable) | | | |
| 16 | ∞ | 0.80 | 1.51633 | 64.1 |
| 17 | ∞ | 0.40 | | |
| Image plane | ∞ | | | |

Aspherical Surface Data
First Surface
K=−1.07330e+002  A4=4.04232e−005  A6=1.96930e−006 A8=−4.86549e−008 A10=2.57221e−010
Second Surface
K=−2.49863e+000  A4=1.45353e−003  A6=−1.88947e−005 A8=6.50736e−007 A10=−1.22778e−008
Fifth Surface
K=−2.52946e−001 A4=−2.90139e−004 A6=−6.10419e−006 A8=2.36183e−007 A10=−1.70905e−008
Fourteenth Surface
K=−9.21809e+002  A4=4.61945e−004  A6=−3.30079e−005 A8=1.21214e−006 A10=−1.83285e−008
Various Data
Zoom ratio 4.71

| | Wide angle | Intermediate | Telephoto |
|---|---|---|---|
| Focal length | 4.43 | 10.29 | 20.85 |
| F-number | 2.88 | 4.09 | 6.06 |
| Viewing angle | 36.73 | 20.64 | 10.53 |
| Image height | 3.31 | 3.88 | 3.88 |
| Total lens length | 32.70 | 30.18 | 38.70 |
| BF | 0.40 | 0.40 | 0.40 |
| d4 | 13.24 | 3.92 | 0.35 |
| d13 | 3.29 | 10.18 | 22.42 |
| d15 | 3.24 | 3.15 | 3.00 |

Zoom Lens Unit Data

| Unit | First surface | Focal length |
|---|---|---|
| 1 | 1 | −10.04 |
| 2 | 5 | 9.20 |
| 3 | 14 | 21.00 |
| 4 | 16 | ∞ |

Second Numerical Example

Unit: mm
Surface Data

| Surface No. | r | d | nd | vd |
|---|---|---|---|---|
| 1* | −61.685 | 1.05 | 1.84954 | 40.1 |
| 2* | 5.583 | 1.69 | | |
| 3 | 9.252 | 1.70 | 1.92286 | 18.9 |
| 4 | 19.812 (variable) | | | |
| 5* | 5.838 | 1.56 | 1.84954 | 40.1 |
| 6 | 63.668 | 0.20 | | |
| 7 | 7.781 | 1.10 | 1.69680 | 55.5 |
| 8 | −52.713 | 0.40 | 1.80518 | 25.4 |
| 9 | 4.016 | 0.82 | | |
| 10 | 67.637 | 0.90 | 1.69680 | 55.5 |
| 11 | −15.129 | 0.50 | | |
| 12 (stop) | ∞ | 0.00 | | |
| 13 | ∞ (variable) | | | |
| 14* | 133.955 | 1.70 | 1.69350 | 53.2 |
| 15 | −18.619 (variable) | | | |
| 16 | ∞ | 0.80 | 1.51633 | 64.1 |
| 17 | ∞ | 0.40 | | |
| Image plane | ∞ | | | |

Aspherical Surface Data
First Surface
K=2.99170e+001  A4=6.18794e−005  A6=2.08972e−006 A8=−4.02488e−008 A10=1.98523e−010
Second Surface
K=−2.60102e+000  A4=1.43378e−003  A6=−1.99566e−005 A8=6.57080e−007 A10=−1.04400e−008
Fifth Surface
K=−2.53141e−001 A4=−2.83935e−004 A6=−6.04981e−006 A8=2.34633e−007 A10=−1.61569e−008

Fourteenth Surface
K=−7.45679e+003 A4=2.36970e−004 A6=−2.67527e−005
A8=1.27469e−006 A10=−2.42672e−008
Various Data
 Zoom ratio 5.86

|  | Wide angle | Intermediate | Telephoto |
|---|---|---|---|
| Focal length | 4.00 | 10.94 | 23.45 |
| F-number | 2.77 | 4.46 | 6.83 |
| Viewing angle | 36.88 | 19.50 | 9.38 |
| Image height | 3.00 | 3.88 | 3.88 |
| Total lens length | 35.53 | 31.30 | 41.65 |
| BF | 0.40 | 0.40 | 0.40 |
| d4 | 16.23 | 4.08 | 0.35 |
| d13 | 3.28 | 11.29 | 25.53 |
| d15 | 3.20 | 3.12 | 2.96 |

Zoom Lens Unit Data

| Unit | First Surface | Focal length |
|---|---|---|
| 1 | 1 | −9.99 |
| 2 | 5 | 9.36 |
| 3 | 14 | 23.68 |
| 4 | 16 | ∞ |

Third Numerical Example

Unit: mm
Surface Data

| Surface No. | r | d | nd | vd |
|---|---|---|---|---|
| 1* | −51.261 | 1.05 | 1.84954 | 40.1 |
| 2* | 5.402 | 1.69 |  |  |
| 3 | 9.249 | 1.70 | 2.14352 | 17.8 |
| 4 | 15.787 (variable) |  |  |  |
| 5* | 5.835 | 1.56 | 1.84954 | 40.1 |
| 6 | 44.039 | 0.20 |  |  |
| 7 | 7.665 | 1.10 | 1.80400 | 46.6 |
| 8 | −29.253 | 0.40 | 2.00069 | 25.5 |
| 9 | 4.515 | 0.82 |  |  |
| 10 | 39.550 | 0.90 | 1.77250 | 49.6 |
| 11 | −12.530 | 0.50 |  |  |
| 12 (stop) | ∞ | 0.00 |  |  |
| 13 | ∞ (variable) |  |  |  |
| 14* | −38.095 | 1.70 | 1.74330 | 49.3 |
| 15 | −12.928 (variable) |  |  |  |
| 16 | ∞ | 0.80 | 1.51633 | 64.1 |
| 17 | ∞ | 0.40 |  |  |
| Image plane | ∞ |  |  |  |

Aspherical Surface Data
First Surface
K=3.41214e+001 A4=3.60248e−005 A6=2.28003e−006
A8=−2.85100e−008 A10=8.30706e−011
Second Surface
K=−2.20877e+000 A4=1.19532e−003 A6=−1.21750e−005
A8=4.66646e−007 A10=−9.65086e−009
Fifth Surface
K=−2.23151e−001 A4=−2.81750e−004 A6=−6.44104e−006
A8=3.80085e−007 A10=−2.73024e−008

Fourteenth Surface
K=−4.54734e+001 A4=−2.90735e−004 A6=−1.54413e−005
A8=1.38780e−006 A10=−3.65759e−008
Various Data
 Zoom ratio 6.24

|  | Wide angle | Intermediate | Telephoto |
|---|---|---|---|
| Focal length | 3.71 | 10.66 | 23.15 |
| F-number | 2.78 | 4.56 | 7.06 |
| Viewing angle | 38.97 | 19.98 | 9.50 |
| Image height | 3.00 | 3.88 | 3.88 |
| Total lens length | 35.54 | 31.13 | 41.66 |
| BF | 0.40 | 0.40 | 0.40 |
| d4 | 16.23 | 3.90 | 0.35 |
| d13 | 3.28 | 11.29 | 25.53 |
| d15 | 3.22 | 3.13 | 2.97 |

Zoom Lens Unit Data

| Unit | First Surface | Focal length |
|---|---|---|
| 1 | 1 | −9.15 |
| 2 | 5 | 8.96 |
| 3 | 14 | 25.59 |
| 4 | 16 | ∞ |

TABLE 1

|  | First Example | Second Example | Third Example |
|---|---|---|---|
| Conditional Expression (1) | −0.56 | −0.49 | −0.47 |
| Conditional Expression (2) | 0.48 | 0.42 | 0.36 |
| Conditional Expression (3) | −1.35 | −1.53 | −1.65 |
| Conditional Expression (4) | 4.65 | 5.81 | 6.19 |
| Conditional Expression (5) | 0.44 | 0.40 | 0.35 |
| Conditional Expression (6) | 0.86 | 0.83 | 0.81 |
| Conditional Expression (7) | 4.74 | 5.92 | 6.90 |

Next, a description will be given of an example of a digital still camera (image pickup apparatus, optical apparatus) using the zoom lens of the present invention as an imaging optical system, with reference to FIG. 7. Referring to FIG. 7, a digital still camera includes a camera body 20, an imaging optical system 21 formed by the zoom lens of the present invention, a solid-state image pickup element (photoelectric conversion element) 22, such as a CCD sensor or a CMOS sensor, incorporated in the camera body 20 so as to receive an object image formed by the imaging optical system 21, a memory 23 for storing information about the object image photoelectrically converted by the image pickup element 22, and a finder 24 formed by a liquid crystal display panel or the like. The object image formed on the solid-state image pickup element 22 is viewed through the finder 24. By thus applying the zoom lens of the present invention to an image pickup apparatus such as a digital still camera, the image pickup apparatus can have a compact size and a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-179028 filed Jul. 31, 2009, which is hereby incorporated by reference herein in its entirety.

What is claimed is:

1. A zoom lens comprising:
    a first lens unit having a negative refractive power;
    a second lens unit having a positive refractive power; and
    a third lens unit having a positive refractive power,
    wherein the first lens unit, the second lens unit, and the third lens unit are arranged in order from an object side to an image side,
    wherein the first, second, and third lens units move during zooming,
    wherein the first lens unit is formed by two lenses,
    wherein the third lens unit is formed by one lens, and
    wherein the following conditional expressions are satisfied:

$$-0.58 < \beta 2w < -0.40$$

$$0.30 < |f1/f3| < 0.50$$

$$-3.0 < m1/fw < -1.3$$

where $\beta 2w$ represents a lateral magnification of the second lens unit at a wide angle end, f1 represents a focal length of the first lens unit, f3 represents a focal length of the third lens unit, fw represents a focal length of the entire zoom lens at the wide angle end, m1 represents a moving amount of the first lens unit along an optical axis from the wide angle end to a telephoto end, and a sign of the moving amount is a positive sign when the first lens unit moves towards the image side.

2. The zoom lens according to claim 1, wherein the following condition is satisfied:

$$4.5 < \beta 2T/\beta 2w < 7.0$$

where $\beta 2T$ represents a lateral magnification of the second lens unit at the telephoto end.

3. The zoom lens according to claim 1, wherein the following condition is satisfied:

$$0.30 < f2/f3 < 0.45$$

where f2 represents a focal length of the second lens unit.

4. The zoom lens according to claim 1, wherein the following condition is satisfied:

$$0.7 < (G1R1+G1R2)/(G1R1-G1R2) < 1.0$$

where G1R1 and G1R2 represent radii of curvature of an object-side lens surface and an image-side lens surface of a lens closest to the object side in the first lens unit.

5. The zoom lens according to claim 1, wherein the focal length f3 of the third lens unit and the focal length fw of the entire zoom lens at the wide angle end satisfy the following conditional expression:

$$4.0 < f3/fw < 10.0.$$

6. The zoom lens according to claim 1, wherein, during zooming from the wide angle end towards the telephoto end, the first lens unit moves towards the image side along a convex path, the second lens unit monotonously moves towards the object side, and the third lens unit moves towards the image side.

7. The zoom lens according to claim 1, wherein the first lens unit includes a negative lens having an object-side aspherical lens surface and an image-side aspherical lens surface.

8. The zoom lens according to claim 1, wherein the third lens unit moves towards the object side so as to perform focusing from an object at infinity to a near object.

9. An optical apparatus comprising a zoom lens, wherein the zoom lens includes:
    a first lens unit having a negative refractive power;
    a second lens unit having a positive refractive power; and
    a third lens unit having a positive refractive power,
    wherein the first lens unit, the second lens unit, and the third lens unit are arranged in order from an object side to an image side,
    wherein the first, second, and third lens units move during zooming,
    wherein the first lens unit is formed by two lenses,
    wherein the third lens unit is formed by one lens, and
    wherein the following conditional expressions are satisfied:

$$-0.58 < \beta 2w < -0.40$$

$$0.30 < |f1/f3| < 0.50$$

$$-3.0 < m1/fw < -1.3$$

where $\beta 2w$ represents a lateral magnification of the second lens unit at a wide angle end, f1 represents a focal length of the first lens unit, f3 represents a focal length of the third lens unit, fw represents a focal length of the entire zoom lens at the wide angle end, m1 represents a moving amount of the first lens unit along an optical axis from the wide angle end to a telephoto end, and a sign of the moving amount is a positive sign when the first lens unit moves towards the image side.

* * * * *